May 26, 1959 R. A. VISSING 2,888,119
CLUTCH AND AUTOMATIC TORSIONAL SHOCK ABSORBER
Filed Sept. 2, 1952 2 Sheets-Sheet 2
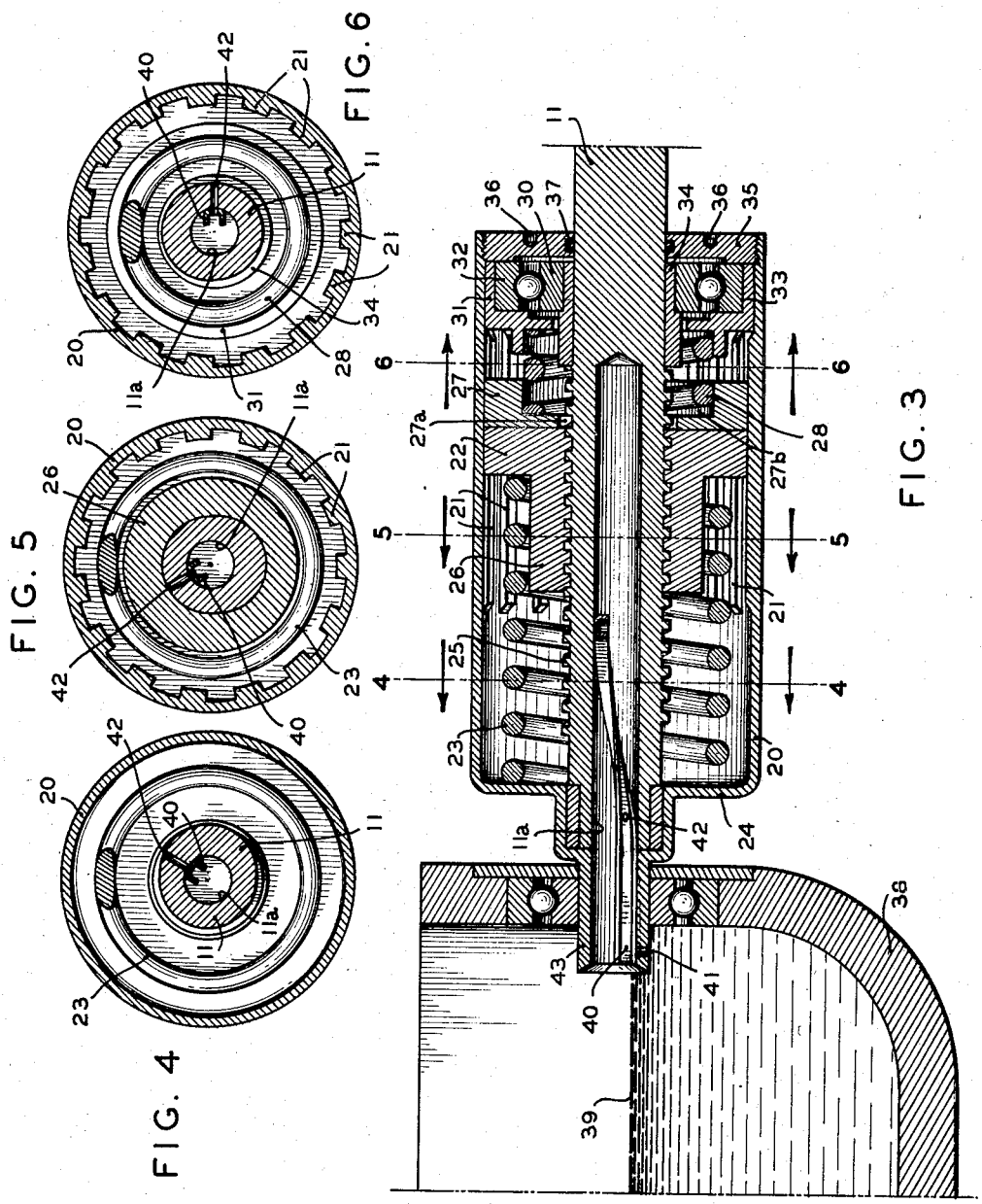
INVENTOR.
Royal A. Vissing

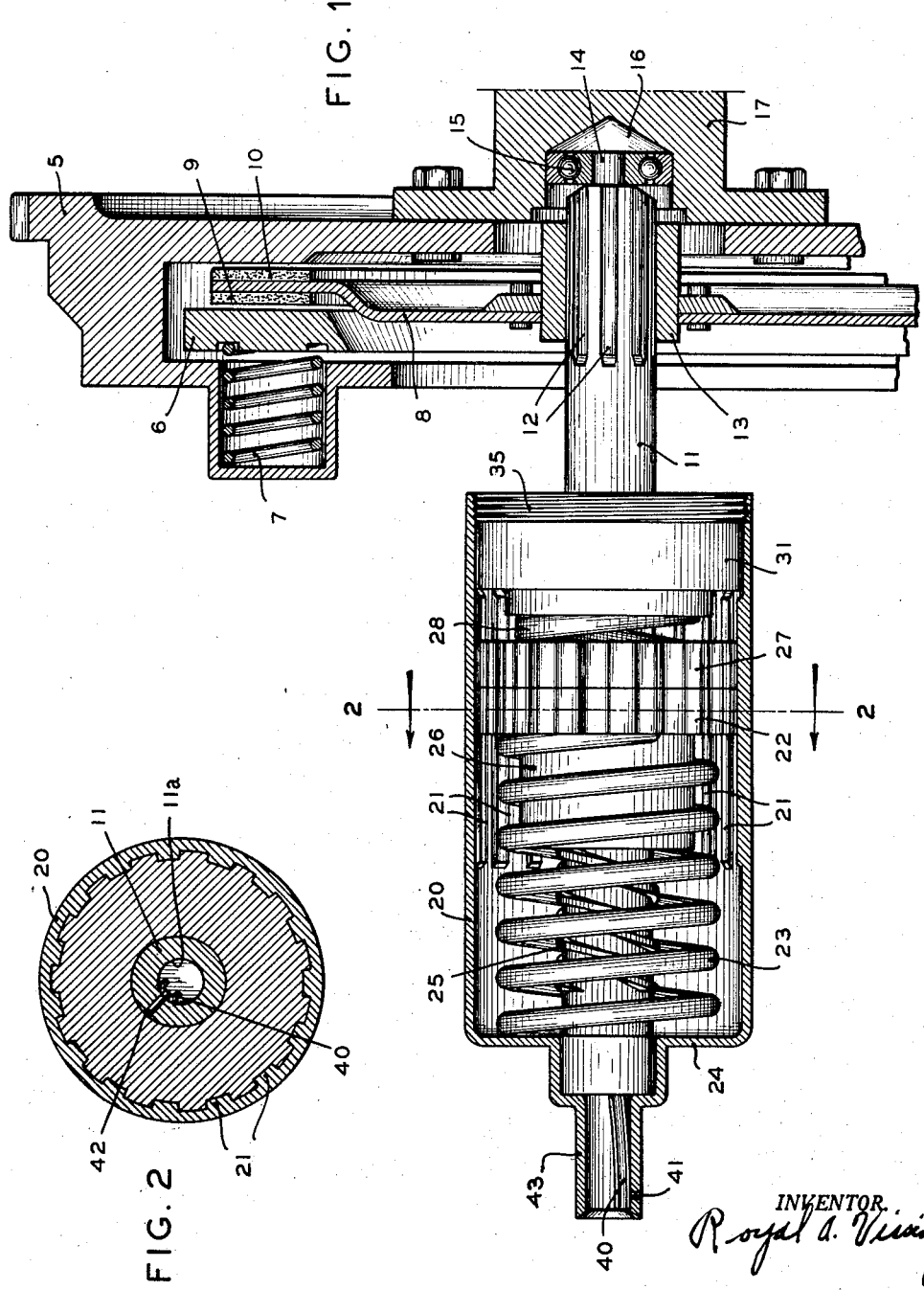

United States Patent Office 2,888,119
Patented May 26, 1959

2,888,119

CLUTCH AND AUTOMATIC TORSIONAL SHOCK ABSORBER

Royal A. Vissing, Idaho Falls, Idaho

Application September 2, 1952, Serial No. 307,419

5 Claims. (Cl. 192—68)

My invention relates to automatic torsional shock absorbers of the type which provide a flexible mechanical coupling between a driving and a driven element. The invention is particularly useful in the automotive field, but is adaptable to industrial usage, as will be understood by those who are familiar with mechanical equipment and power transmission machinery.

In order for a torsional shock absorber to be practical for an automobile or other vehicle, it must at all times be ready to cushion the shock to the vehicle parts when the clutch is engaged to start the vehicle. Many torsional shock absorbers have been designed and even patented, but in most cases they have depended on an overdrive from the wheels to reset them. This was very undesirable because it would be found that when climbing a hill or mountain if an immediate full stop became necessary there would be no overdrive from the wheels and consequently no means would be available for cushioning the torque when the vehicle was started again. A sudden engagement of the racing motor and the torque or drive shaft might, under the conditions obtaining on a steep slope, cause breaking of an axle, differential gears, transmission gears, etc., thus defeating the purpose of the shock absorber. This disadvantage of prior shock absorbers is entirely overcome by the construction embodying my invention.

The shock absorber of my invention permits a quick acceleration of the motor without undue stresses thereon when the load is suddenly thrown on it, and without the usual spinning of the drive wheels.

A further advantage of my shock absorber is that it will allow partial rotation or several rotations of the drive shaft and will take up all slack in the gears without undue wear or stresses on those parts, increasing the life of many parts of the automobile and affording greater comfort to its occupants.

Another object is to provide a shock absorber which is relatively small and is easily mounted in the small space usually available between the clutch and transmission.

Another object is to provide a shock absorber which is relatively light in weight and is fully enclosed in a single unit which may be balanced for high speed rotation.

A further object is to provide a shock absorber which will rotate the clutch plate during resetting.

A still further object is to provide a simple but effective construction for lubricating the shock absorber from the transmission housing or other source of lubricant.

Other objects and advantages will be understood from the following description of the preferred embodiment of the invention shown in the accompanying drawings forming a part of this specification.

In the drawings:

Fig. 1 is a diametric section through the torsional shock absorber showing parts of a conventional clutch associated therewith;

Fig. 2 is a cross section on line 2—2 of Fig. 1;

Fig. 3 is a sectional view of the shock absorber omitting the clutch but showing part of a transmission housing and the lubricating means; and Figs. 4, 5 and 6 are respectively cross sections on lines 4—4, 5—5 and 6—6 of Fig. 3.

Referring particularly to the drawings, the invention is shown embodied in an assembly, or device, for absorbing shock, disposed between a driving member such as a flywheel 5 and a driven shaft (not shown) in a transmission. As shown the conventional clutch partly illustrated includes a pressure plate 6, clutch springs 7 (only one being shown) housed in the flywheel and extending against the pressure plate, clutch plate 8 having frictional rings 9, 10 fixed adjacent its periphery on opposite sides, and shaft 11 having splines 12 for driving engagement with a splined collar 13 fixed to the center of the clutch plate. The adjacent end of shaft 11 is reduced as at 14 and is supported by an anti-friction pilot bearing 15 enclosed in a counterbore 16 provided in the end of crankshaft 17. When the pressure plate 6 is permitted to press against the clutch plate 8, the latter will obviously rotate with the flywheel 5 and the crankshaft 17, and due to the spline connection between the clutch plate and shaft 11, said shaft will then be driven by the crankshaft. Other well known mechanical clutches may be used in lieu of the one disclosed.

The torsional shock absorber embodying my invention is supported on shaft 11 and includes a casing 20 having longitudinal splines 21 on its interior, a splined nut 22 slidably engaging splines 21, a compression coil spring 23 interposed between the end wall 24 of the casing and the nut 22, and relatively steep screw threads 25, preferably multiple threads, formed on shaft 11 for part of its length, the nut 22 being complementarily threaded internally so that it may travel longitudinally of the shaft whenever the shaft is rotated. Preferably the parts are so designed that if the shaft is held vertical and stationary, with spring 23 removed, nut 22 will move longitudinally down the shaft due to the force of its own weight. Compression spring 23, which is a resetting spring, fits over a cylindrical collar 26 forming an extension of the nut. A spring follower or contact plate 27 also surrounds the shaft 11 but has a central bore 27ᵃ which permits it to clear the screw threads 25, while its periphery is splined to engage splines 21 to permit sliding within the casing 20 without relative rotation. Received within a counterbore or recess 27b provided in the spring follower 27 is one end of a short buffer spring 28, which is also a coil spring adapted to act when under compression, and has its end secured to the spring follower 27 in any suitable way. Normally the spring follower 27 and nut 22 are in contact as illustrated in Fig. 3. A bearing holder 31 receives the opposite end of buffer spring 28 and snugly fits the interior of housing 20, abutting the ends of splines 21. Spring 28 also serves to cushion the torque transmitted by the wheels to the motor when the wheels overdrive the motor. Additionally, spring 28 in combination with splined contact plate 27 cushions the blow when the nut 22 suddenly contacts plate 27 due to the releasing of the clutch, eliminating any clicking sound or slap, especially when heavy oil is applied to the parts.

An anti-friction bearing 32 is enclosed in a counter bore 33 in the bearing holder 31. A sleeve 34 is fixed upon shaft 11 and supports bearing 30. This sleeve is enlarged at its inner end but there is a clearance between its enlarged end and the inner edge of bearing holder 31. Sleeve 34 limits the end travel of shaft 11. To close and seal the adjacent end of the housing a screw threaded cover 35, having shallow bores 36 for a spanner wrench, is screwed into the housing end and then abuts bearing 32. A felt retainer 37 is fitted into the inner edge of cover 35 to prevent leakage of oil. Preferably the anti-friction bearing 32, bearing holder 31, buffer spring 28 and spring follower 27 form a unitary assembly which may be slipped off the shaft when the cover 35 is removed. This assembly cannot rotate relative to the casing.

At the opposite end of the casing, an extension 43 is provided which is secured to the drive shaft of the transmission (not shown) or driven shaft in any preferred way. The transmission housing 38 is partially shown in Fig. 3, also some of the lubricant 39 normally present therein. In the preferred arrangement, some of this lubricant is carried into the interior of the described shock absorber by means of a thin metal spiral channel member 40 slipped into the central bore 11ª of shaft 11. A duct 41 extends radially through the shaft near its end and other radial ducts 42 are provided in the shaft to conduct lubricant traveling along the spiral channel 40 outwardly to the interior of the casing. It will be understood that the spiral channel on the interior of the shaft acts as a sort of pump for the lubricant when the shaft 11 is rotating in the normal direction. The necessary felt washers or other lubricant seals will be supplied but are not all shown, as they are not part of the invention.

Operation

Assuming that the coil spring 23 is fully expanded (position of Fig. 3) and the automobile is at rest but the engine is turning the crankshaft. Upon engaging the clutch, torque is applied to shaft 11 which due to multiple threads 25 and splines 21 forces the nut 22 to move against resetting spring 23 to compress the same. Compression continues until the resistance to further axial movement of the nut is greater than the force tending to rotate the nut. The nut will then rotate with shaft 11, causing the casing 20 to rotate also because of the splines 21, and extension 43 will drive the transmission, which in turn will drive the wheels to put the automobile in motion. No apparent mechanical action will take place within the device until the wheels overdrive the motor (as may occur going down hill) or else the clutch plate is released. In the event of overdrive the casing 20 will be rotated faster than shaft 11, and nut 22 will be moved back until it contacts spring follower plate 27 and compressed buffer spring 28. When the clutch is released, the compressed resetting spring 23 will act against nut 22 which will reversely rotate the freed clutch plate through the threaded shaft 11 thereby resetting the parts. In short, the mechanism under every condition of driving will absorb torque. The helix angle of shaft 11 and the fitting of nut 22 thereon must be such that compressed spring 23 acting on nut 22 will rotate the shaft every time it is free to do so.

The described shock absorber will be extremely useful in military trucks and vehicles because of the severe service conditions they encounter.

Having described the preferred form of the invention, what I claim as new and desire to secure by Letters Patent is:

1. In a shock absorbing assembly adapted to be disposed between a driving member and a load member the combination of a releasable clutch mechanism including an element rotatable in either direction of rotation; a rotatable casing adapted to be connected to said load member; a shaft mounted in said casing and directly connected to said reversibly rotatable clutch element, said shaft having external screw threads, a nut mounted on said shaft, threaded means in said nut shaped to coact with said threaded means on the shaft to effect axial movement of the nut along said shaft; spline connection driving means between said nut and said casing; a compression spring between an end of the casing and said nut adapted to be compressed by movement of the nut in one direction in said casing; the helix angle of said threads on said shaft and nut being such that the coil spring upon compression urges the shaft in a direction of rotation opposite to that in which it is being driven whereby to effect reverse rotation of said clutch element upon release of the clutch mechanism whereby to return the components of the shock absorber to their normal positions; a spring follower freely encircling said shaft adjacent said nut and mounted to be moved axially of said casing; spline connection means between said casing and said follower; bearing holding means mounted in said casing and encircling said shaft; an anti-friction bearing retained by said holding means and supporting said shaft; and coil spring means encircling said shaft and disposed between said follower and said bearing holding means, said coil spring means adapted to be compressed when said follower is moved in the direction of said bearing holding means.

2. In a shock absorbing assembly adapted to be disposed between a driving member and a load member the combination of a releasable clutch mechanism including an element rotatable in either direction of rotation; a rotatable casing adapted to be connected to said load member; the operation of said clutch being independent of any longitudinal movement of said casing, a shaft mounted in said casing and directly connected to said reversibly rotatable clutch element, said shaft having external screw threads, a nut mounted on said shaft, threaded means on said nut shaped to coact with said threaded means on the shaft to effect axial movement of the nut along said shaft; spline connection driving means between said nut and said casing; a compression spring between an end of the casing and said nut adapted to be compressed by movement of the nut in one direction in said casing; the helix angle of said threads on said shaft and nut being such that the coil spring upon compression urges the shaft in a direction of rotation opposite to that in which it is being driven whereby to effect reverse rotation of said clutch element upon release of the clutch mechanism whereby to return the components of the shock absorber to their normal positions; a spring follower freely encircling said shaft adjacent said nut and movable axially of said casing; spline connection means between said casing and said follower; bearing holding means mounted in said casing and encircling said shaft; an anti-friction bearing retained by said holding means supporting said shaft; coil spring means encircling said shaft and disposed between said follower and said bearing holding means, said bearing holding means abutting one end of the spline connections in the casing, and sleeve means between said shaft and anti-friction bearing, said sleeve extending axially inwardly of said casing and acting between said bearing and said shaft to limit axial movement of the shaft.

3. In a device to absorb torque between a driving member and a driven member in a transmission, the combination of a rotatable cylinder terminating at one end in a tubular portion defining a hollow rotatable driving shaft; means for mounting said driving shaft to project into said transmission; a two-element releasable clutch having one clutch element adapted to be driven by said driving member and means for mounting the other clutch element for rotation in either direction of rotation; a rotatable driven shaft having one end connected to said last-named clutch element and the other end suitably supported by the end of the casing whereby the axis of said driving shaft is in alinement with the axis of said driven shaft, said driven shaft having a hollow portion in communication with the hollow portion of said driving shaft, said driven shaft having radial ports effecting communication between the hollow portion of the driven shaft and the casing; said hollow driving shaft and driven shaft having a spiral channel member fixed in the hollow portions to define a pump to carry transmission oil to the interior of the casing upon rotation of said shafts.

4. In a shock absorbing assembly, the combination of a rotatable casing, a shaft mounted in said casing and having external screw threads, a nut mounted on said shaft, threaded means in said nut shaped to coact with said threaded means on the shaft to effect axial movement of the nut along said shaft, spline connection driving means between said nut and said casing, a compression spring between an end of the casing and said nut adapted to be compressed by movement of the nut in one direction in said casing, the helix angle of said threads on said shaft and nut being such that the coil spring upon compression urges the shaft in a direction of rotation opposite to that in which it is rotated to compress the spring whereby to return the components of the shock absorber to their normal positions, a spring follower freely encircling said shaft adjacent said nut and mounted to be moved axially of said casing, spline connection means between said casing and said follower, bearing holding means mounted in said casing and encircling said shaft, an anti-friction bearing retained by said holding means and supporting said shaft, and coil spring means encircling said shaft and disposed between said follower and said bearing holding means, said coil spring means adapted to be compressed when said follower is moved in the direction of said bearing holding means.

5. A device as defined in claim 4 wherein said bearing holding means abut one end of the spline connections in the casing, and sleeve means between said shaft and anti-friction bearing, said sleeve extending axially inwardly of said casing and acting between said bearing and said shaft to limit axial movement of the shaft.

References Cited in the file of this patent

UNITED STATES PATENTS

| | | |
|---|---|---|
| 1,049,532 | Prescott | Jan. 7, 1913 |
| 1,251,933 | Stanley | Jan. 1, 1918 |
| 1,640,894 | Hebert et al. | Aug. 30, 1927 |
| 1,900,096 | Bushong | Mar. 7, 1933 |
| 2,135,722 | Lee | Nov. 8, 1938 |
| 2,290,835 | Lorimor | July 21, 1942 |

FOREIGN PATENTS

| | | |
|---|---|---|
| 421,749 | France | Jan. 4, 1911 |
| 704,516 | France | Feb. 23, 1931 |